US006244565B1

(12) United States Patent
McDonnell et al.

(10) Patent No.: US 6,244,565 B1
(45) Date of Patent: Jun. 12, 2001

(54) THROTTLE BODY SHAFT AXIAL PLAY CONTROL

(75) Inventors: Alex McDonnell, Dexter; Edward Albert Bos, Ann Arbor; Mark Warner Semeyn, Ypsilanti, all of MI (US)

(73) Assignee: Ford Global Technologies, Inc., Dearborn, MI (US)

( * ) Notice: Subject to any disclaimer, the term of this patent is extended or adjusted under 35 U.S.C. 154(b) by 0 days.

(21) Appl. No.: 09/240,762

(22) Filed: Jan. 29, 1999

(51) Int. Cl.[7] ............................ F02D 9/08; F16K 31/04; F16K 1/226

(52) U.S. Cl. ................................ 251/129.12; 251/305

(58) Field of Search ................................ 251/305, 306, 251/307, 308, 129.11, 129.12; 411/517, 519

(56) References Cited

U.S. PATENT DOCUMENTS

| | | | |
|---|---|---|---|
| 2,902,303 | * 9/1959 | Davis | 411/517 |
| 2,924,424 | 2/1960 | Tittering . | |
| 3,527,120 | * 9/1970 | Duer et al. | 411/519 |
| 3,924,596 | 12/1975 | Klemm . | |
| 4,008,877 | 2/1977 | Yasuoka . | |
| 4,601,271 | 7/1986 | Ejiri et al. . | |
| 4,775,273 | * 10/1988 | Bauer | 411/517 |
| 4,827,884 | 5/1989 | Cook . | |
| 4,838,226 | 6/1989 | Matsuzawa . | |
| 4,848,505 | 7/1989 | Yoshizawa . | |
| 4,873,954 | 10/1989 | Codling . | |
| 4,879,657 | 11/1989 | Tamura et al. . | |
| 4,892,071 | 1/1990 | Asayama . | |
| 4,947,815 | 8/1990 | Peter . | |
| 4,961,355 | 10/1990 | Irino . | |
| 4,986,238 | 1/1991 | Terazawa . | |
| 4,991,552 | 2/1991 | Luft et al. . | |
| 5,014,666 | 5/1991 | Westenberger . | |
| 5,018,496 | 5/1991 | Buchl . | |
| 5,038,733 | 8/1991 | Westenberger . | |
| 5,078,110 | 1/1992 | Rodefeld . | |
| 5,103,787 | 4/1992 | Bassler et al. . | |
| 5,113,822 | 5/1992 | Asayama . | |
| 5,148,790 | 9/1992 | Hickman et al. . | |
| 5,161,508 | 11/1992 | Zentgraf et al. . | |
| 5,168,852 | 12/1992 | Moriguchi . | |
| 5,168,951 | 12/1992 | Sugiura . | |
| 5,259,349 | 11/1993 | Radinski . | |
| 5,265,572 | 11/1993 | Kadomukai . | |
| 5,275,375 | 1/1994 | Semence . | |
| 5,297,521 | 3/1994 | Sasaki . | |
| 5,297,522 | 3/1994 | Buchl . | |
| 5,325,832 | 7/1994 | Maute . | |
| 5,423,299 | 6/1995 | Kumagai . | |
| 5,429,090 | 7/1995 | Kotchi . | |
| 5,492,097 | 2/1996 | Byram . | |
| 5,630,571 | 5/1997 | Kipp . | |
| 5,752,484 | 5/1998 | Apel . | |
| 5,775,292 | 7/1998 | Seeger . | |

FOREIGN PATENT DOCUMENTS

| | | |
|---|---|---|
| 1-239-533 | 4/1967 | (DE) . |
| 40 39 937 | 6/1992 | (DE) . |
| 41 41 104 | 6/1993 | (DE) . |
| 0 574 093 | 6/1991 | (EP) . |
| 651147 | 9/1994 | (EP) . |
| 2217 389 | 10/1989 | (GB) . |
| 2 233 038 | 1/1991 | (GB) . |
| 1-24129 | 1/1989 | (JP) . |
| 2-780932 | 9/1990 | (JP) . |

* cited by examiner

*Primary Examiner*—Kevin Shaver
*Assistant Examiner*—Eric Keasel
(74) *Attorney, Agent, or Firm*—Mark L. Mollon

(57) ABSTRACT

An electronic throttle control system with a housing having a motor, throttle valve and gear mechanism. The throttle valve is attached to a throttle body shaft which is mounted in bearings in the housing. An axial spring clip mechanism mounted on the throttle body shaft preloads the bearings and eliminates undesired axial and radial movement of the shaft which could adversely affect the movement of the throttle valve and the sensing of its position.

8 Claims, 7 Drawing Sheets

THROTTLE BODY SHAFT AXIAL PLAY CONTROL

CROSS-REFERENCE TO RELATED APPLICATIONS

The present application is related to the following patent applications which are co-owned by the same assignee and filed on the same date herewith: "Electronic Throttle Control With Default Mechanism Subassembly," Ser. No. 09/239,695, filed Jan. 29, 1999; "Default Mechanism For Electronic Throttle Control System," Ser. No. 09/240,761, filed Jan. 29, 1999; and "Electronic Throttle Control With Adjustable Default Mechanism," Ser. No. 09/240,340, filed Jan. 29, 1999,

TECHNICAL FIELD

This invention relates to electronic valve control systems and more particularly to an electronic throttle control system for an internal combustion engine.

BACKGROUND

Valve assemblies for engines and related systems typically utilize rotatable valve members in fluid flow passageways to assist in regulating fluid flow through them. For example, throttle valve members are positioned in the air induction passageways into internal combustion engines. The valve assemblies are controlled either mechanically or electronically and utilize a mechanism which directly operates the valve member.

Known electronic throttle control assemblies utilize a plurality of components which typically are difficult and time consuming to assemble together. Also, the throttle or valve plate is positioned on a throttle body shaft which often experiences undesirable axial or radial movement which can adversely affect the operation of the valve assembly.

For electronic throttle control systems, it also is desirable to have a fail-safe mechanism or system which allows the throttle valve to open or remain open in the event that the electronic control or electronic system of the vehicle fails.

It would be desirable to have an electronic valve control system which addressed the above concerns and provides an improved assembly and system, which also reduces costs and improves reliability.

SUMMARY OF THE INVENTION

The present invention provides an electronic throttle control assembly having a housing with a motor, a gear train and throttle valve. A throttle plate is positioned on a throttle shaft and the plate and shaft are positioned in the engine or air induction passageways, such that the throttle plate regulates airflow into the engine.

The operation of the throttle valve is accomplished by a gear train assembly driven by a DC motor. The motor is regulated by the electronic control unit of the vehicle which in turn is responsive to the input of the vehicle operator or drives. A throttle position sensor is included in a housing cover and feeds back the position of the throttle plate to the electronic control unit.

The throttle body shaft is held in the throttle valve section of the control assembly housing by bearing members. Axial and radial movement ("play") of the throttle body shaft is prevented by an axial clip member which is secured on one end of the shaft.

In the operation of the throttle valve, a gear connected to the motor operates an intermediate gear, which in turn operates a sector gear which is connected to the throttle body shaft. The sector gear is biased by a spring member in both the open and closed positions of the throttle valve.

As a fail-safe mechanism, a default lever is operably attached to the spring member and operated by a boss attached to the intermediate gear. The bias of the spring member in combination with the default lever operates to open the throttle valve in the event of failure of the electronic system.

Other features and advantages of the present invention will become apparent from the following description of the invention, particularly when viewed in accordance with the accompanying drawings and appended claims.

DESCRIPTION OF THE PREFERRED EMBODIMENT(S)

Figure 1:
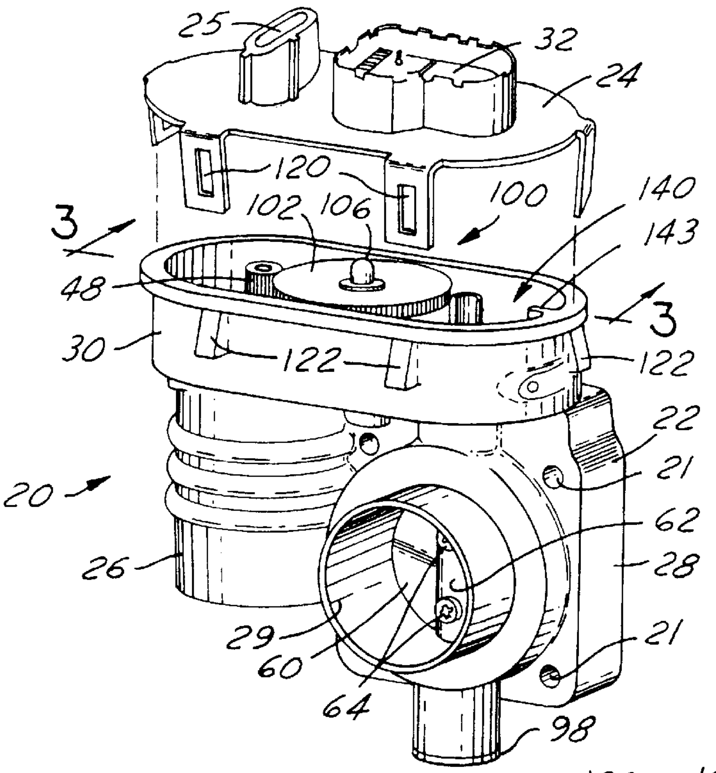
FIG. 1 illustrates an electronic throttle control assembly in accordance with the present invention.
Figure 3:
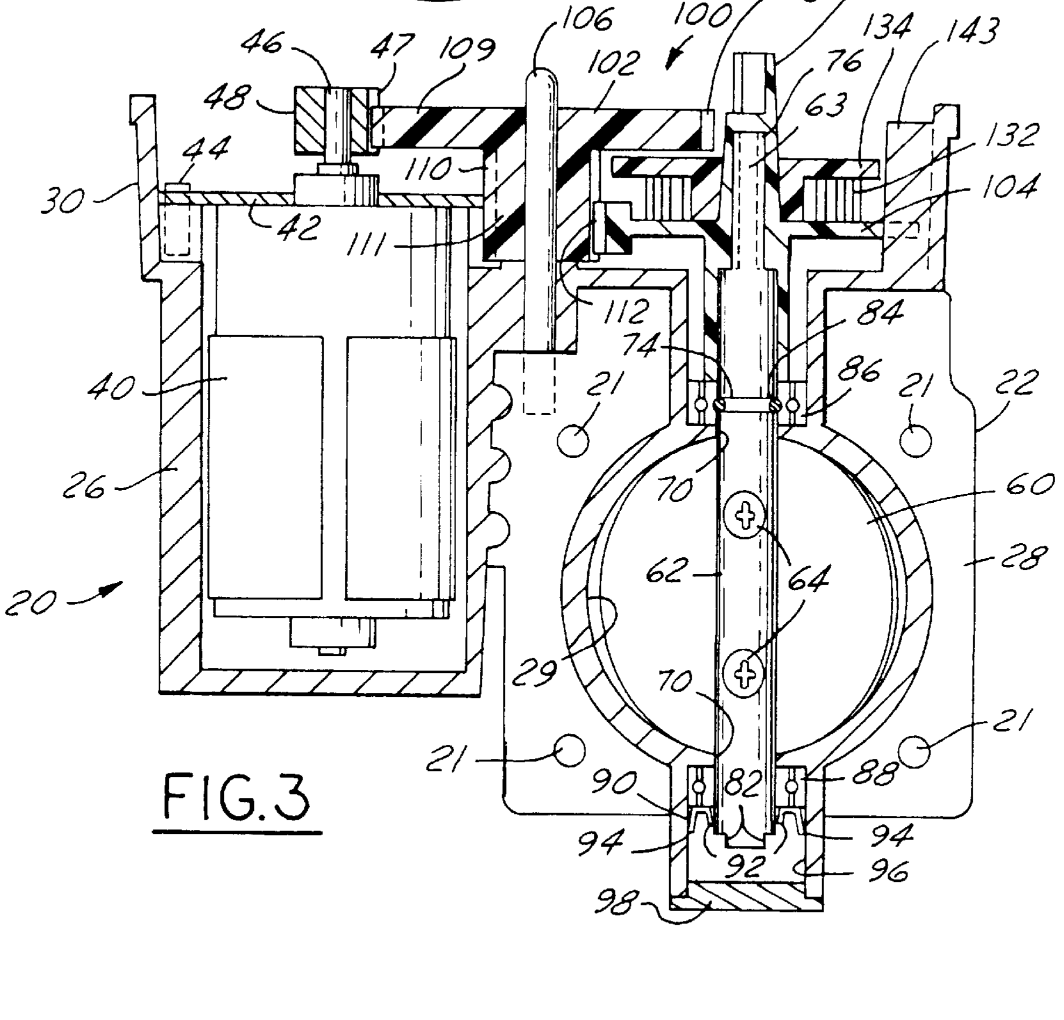
FIG. 3 is a cross-sectional view of the electronic throttle control assembly of FIG. 1, the cross-section being taken along line 3—3 in FIG. 1 and in the direction of the arrows.
Figure 2:
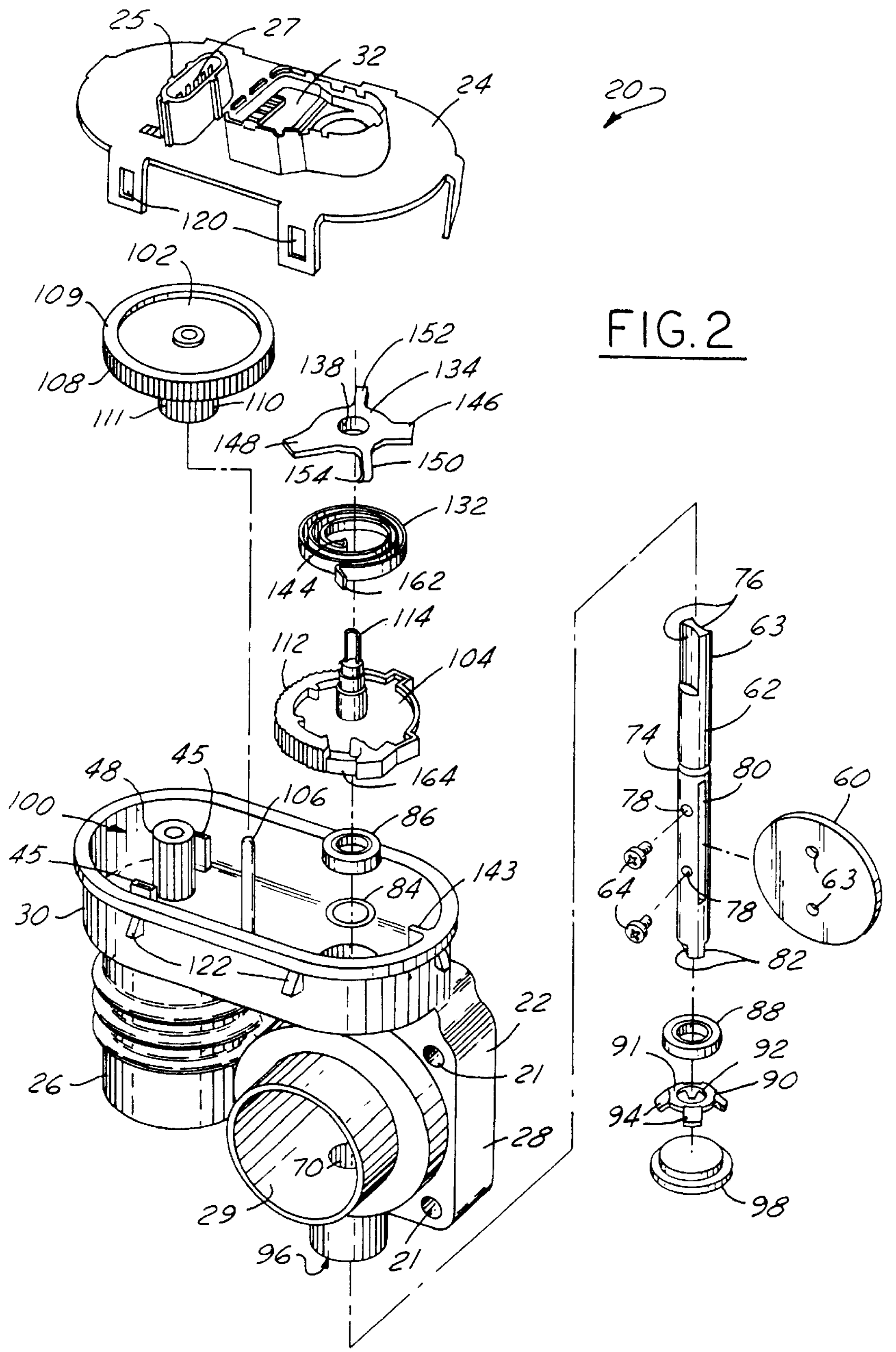
FIG. 2 is an exploded view of the electronic throttle control assembly of FIG. 1.

FIGS. 1–3 illustrate one embodiment of an electronic throttle control assembly in accordance with the present invention. FIG. 1 illustrates the assembly 20 in its assembled form, FIG. 2 illustrates the components of the assembly in an exploded condition, and FIG. 3 is a cross-sectional view of the assembly 20 as shown in FIG. 1 (without the cover).

The electronic throttle control assembly 20 includes a housing or body member 22 and a cover member 24. The housing 22 includes a motor section 26, a throttle valve section 28, and a gear train section 30. The cover member 24 includes the throttle position sensor (TPS) 32, together with related electronics, which reads or "senses " the position of the throttle valve and transmits it to the electronic control unit (not shown) of the vehicle. In order to connect the ECU to the TPS, an electrical connector 25 is positioned at one end of the cover 24. The connector preferably has six contacts: two to the motor which regulates the position of the throttle valve; and four to the TPS and related electronics.

When the driver or operator of the vehicle presses the vehicle accelerator, the electronic control unit (ECU) sends a signal to the electronics in the electronic throttle control assembly 20 which operates the motor which in turn operates the gear train and adjusts the position of the throttle valve. The throttle valve is positioned in the main air passageway 72 from the air intake inside the engine compartment to the internal combustion engine. The throttle valve thus regulates the airflow to the internal combustion engine.

The precise position of the throttle valve in the airflow passageway is sensed by the TPS and relayed or fed back to the ECU in order to confirm or adjust the desired throttle valve setting.

The cover member can be attached to the body member 22 in any conventional manner, but preferably is connected by a snap tab mechanism. For this purpose, a series of openings 120 are provided in the cover member for mating with a series of tab members 122 on the outside of the gear section 30 of the housing 22. Also, an appropriate gasket or sealing member (not shown) is preferably positioned between the cover member and the housing in order to protect the gear train and TPS from dirt, moisture and other environmental conditions. When the electronic throttle control assembly 20 is utilized, it is positioned in the engine compartment of the vehicle and bolted or otherwise securely fastened to the vehicle. For this purpose, a plurality of holes 21 are provided in the housing.

The motor 40, as best shown in FIG. 3, is a thirteen volt DC motor. The motor 40 is connected to a mounting plate 42 which is bolted or otherwise securely fastened to the body member 22 by a plurality of bolts, screws, or other fasteners 44. The plate 42 also has a pair of contacts (not shown) which electrically connect the electronics in the cover member 24 to the motor 40.

The motor 40 has a shaft 46 on which a small spur gear 48 is positioned. The gear 48 has a plurality of teeth 47 which mesh with and rotate adjacent gears, as described below. The throttle plate 60 is secured to a throttle body shaft 62 which in turn is positioned in the throttle section 28 of the body member or housing 22. The throttle plate 60 is secured to the throttle body shaft 62 by a plurality of small fasteners or plate screws 64. The throttle shaft 62 is positioned in a bore or channel 70 in the throttle section of the body member 22. The bore 70 is transverse to the axis of the air flow passageway 72.

Throttle shaft 62 has an O-ring channel or groove 74, a pair of flats or recesses 76 at the upper end for connection to one of the gears (as explained below), a pair of openings 78 for positioning of the plate screws therethrough, an axial or longitudinally extending slot 80 for positioning of the throttle plate 60 therein, and a pair of flats or recesses 82 at the lower end for use in assembling and positioning the throttle valve. The flats 82 are utilized to rotate the throttle shaft 62 during assembly of the throttle plate and also during orientation and setup of the throttle positioning sensor (TPS) mechanism. An 0-ring 84 is positioned in the channel 72 on the throttle shaft. The O-ring 4 provides a seal between the air in the air flow passageway and the gear train compounds and electronics in the cover. For assembly of the throttle body shaft and throttle plate in the assembly 20, the throttle body shaft 62 is first positioned in the bore 70 and rotated in order to allow the plate 60 to be positioned in slot 80. The throttle body shaft 62 is then turned approximately 90 degrees in order to allow the throttle plate screws 64 to be secured through the shaft and plate, thereby securely affixing the plate to the shaft.

When the throttle body shaft 62 is positioned in the housing 22, a pair of bearings 86 and 88 are provided to allow the throttle body shaft to rotate freely in the housing. The bearings 86 and 88 are conventional ball-bearing members with pairs of races separated by small ball-bearings.

Figure 14:
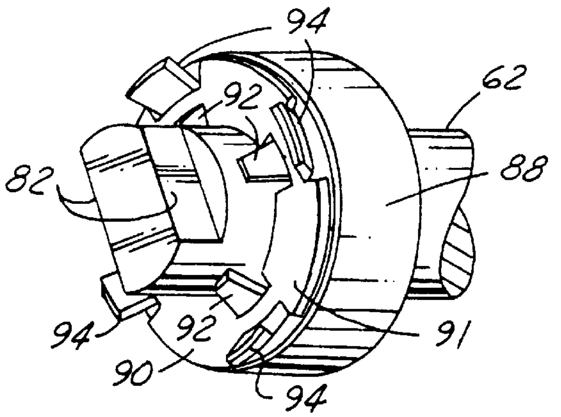
FIG. 14 illustrates the positioning of a axial spring clip member on a throttle shaft in accordance with one embodiment of the present invention.
Figure 15:
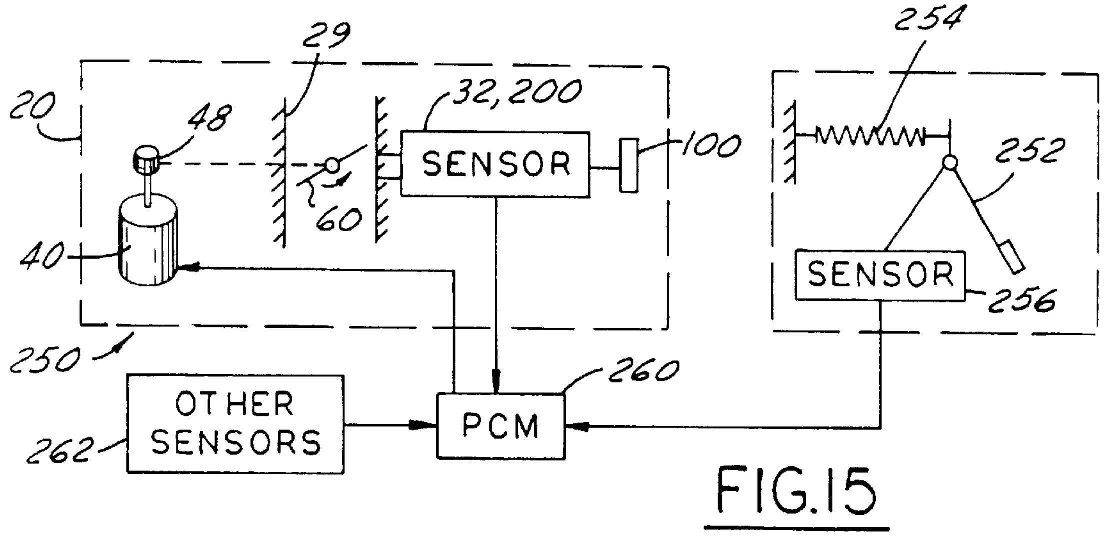
FIG. 15 is a schematic illustration showing a representative circuit diagram which can be utilized with the present invention.
Figure 16:
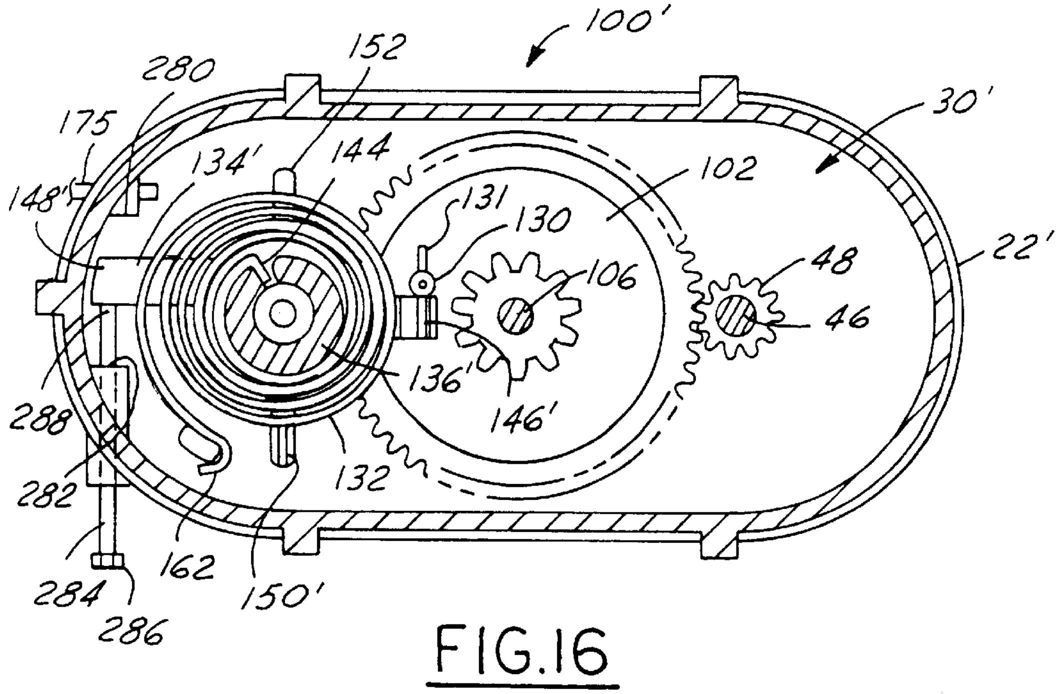
FIG. 16 illustrates an adjustable default mechanism which can be utilized with the present invention.
Figure 17:
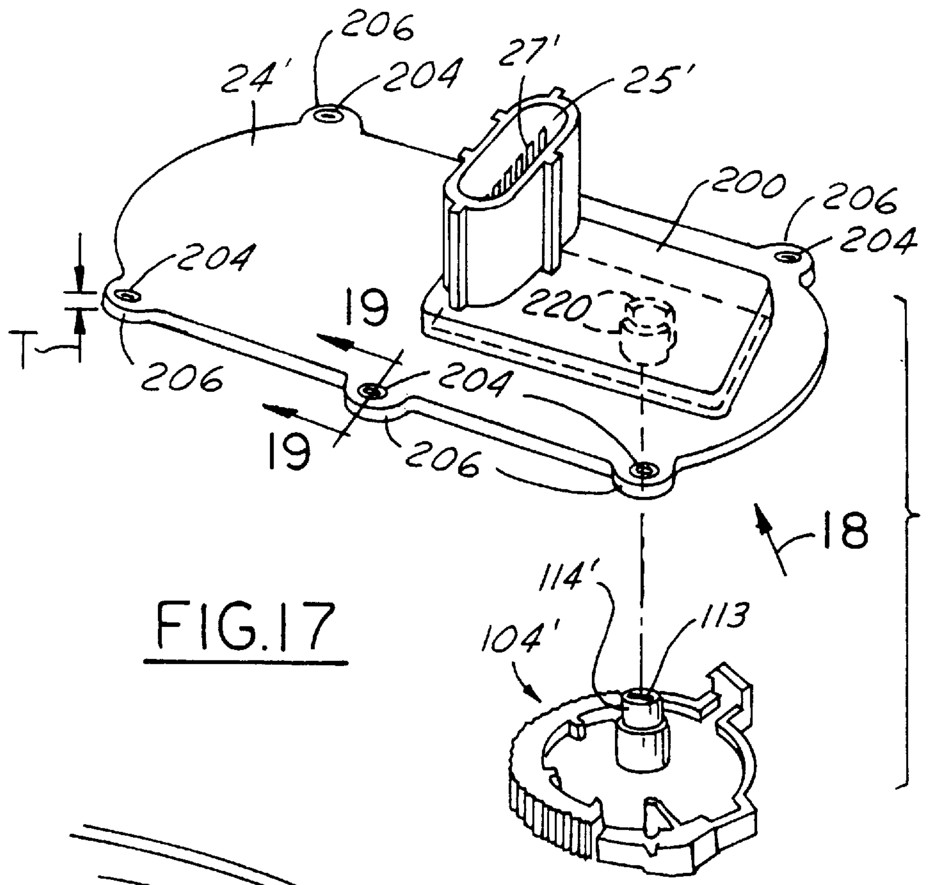
FIGS. 17–19 illustrate an alternative embodiment of cover member and an alternative embodiment of the invention.
Figure 18:
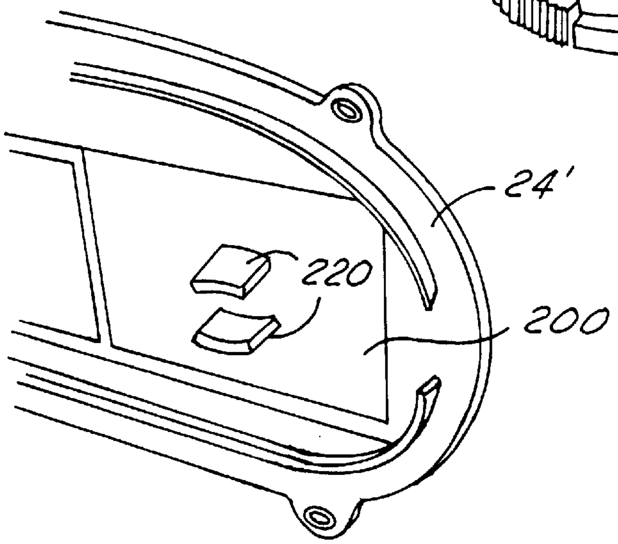
Figure 19:
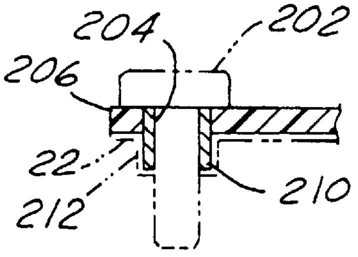

As shown in FIG. 3, once the throttle body shaft 62 is positioned in the body member 22 with the throttle plate 60 secured to it, an axial spring clip member 90 is secured to the lower end of the shaft. The spring clip 90 is also shown in more detail in FIGS. 2, 12 and 14. The spring clip 90 has a central annular disc 91, a plurality of inner spring tab members 92 and a plurality of outer spring tab members 94. The spring clip member 90 is preferably made of a spring steel material. The tab members 90 and 92 securely hold the axial spring clip member 90 in place on the throttle body shaft 62 and hold the throttle body shaft 62 securely in position in the throttle section 28 of the body or housing member 22. In this regard when the assembly 22 is assembled, as shown in FIG. 3, the outer tab members 94 are securely wedged against the inside surface of cavity 96 on the lower end of the throttle section 28, while the inner tab members 92 are wedged against the surface of the throttle shaft 62.

The axial spring clip member 90 eliminates axial or longitudinal movement (or "play") of the throttle body shaft 62 inside of the throttle section. The upper end of the throttle body shaft 62 is secured against axial movement by the lower end of the molded sector gear (as shown in FIGS. 3 and as described in more detail below), while the axial spring clip 92 securely and tightly affixes the lower end of the throttle body shaft against axial movement.

During assembly, the clip member 90 is pushed or forced onto the shaft 62 until it contact the inner race of bearing 88. Preferably, the clip member 90 is installed with a predetermined load. The load pre-loads both of the bearings 86 and 88 and eliminates any possible axial movement of the shaft in the assembly 22. The pre-load on the bearings also eliminates any radial movement or "slop " between the inner and outer races of the bearings.

The elimination of the axial and radial movement of the throttle shaft in the assembly improves the quality of the feedback signal provided by the TPS to the ECU. The movement of the throttle body shaft and hence the throttle plate will be more accurately and precisely sensed and read by the TPS and thus more accurately and precisely relayed to the EPU. The pre-loading of the bearing members also eliminates the burnishing of the ball-bearing members in the bearings during normal vehicle operation.

Thereafter, once the spring clip member 90 is installed in position, an end cap member or plug member 98 is positioned on the end of the cavity 96. This protects the lower end of the shaft from moisture, dirt and other environmental conditions which might adversely affect the operation of the throttle valve.

Figure 4:
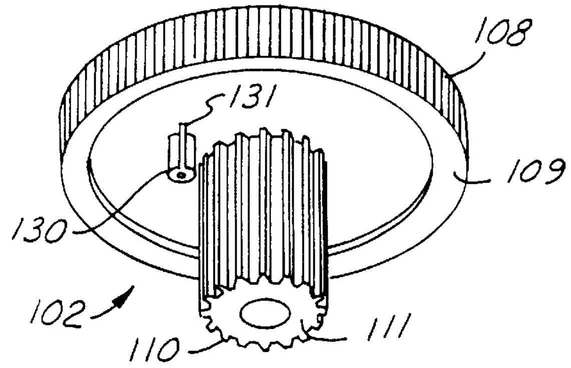
FIG. 4 depicts an intermediate gear member which can be utilized with the present invention.
Figure 7:
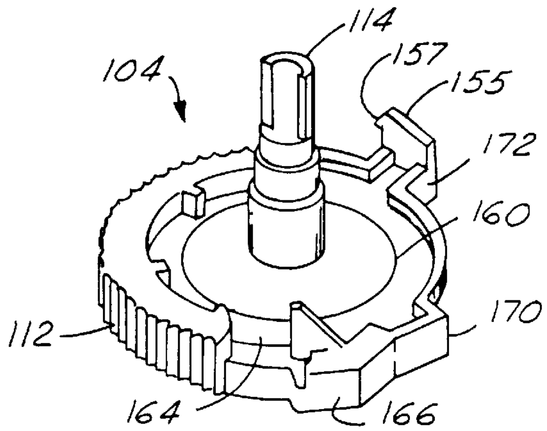
FIG. 7 illustrates a sector gear member which can be utilized with the present invention.

The gear assembly or gear train used with the electronic control assembly 20 in accordance with the present invention is generally referred to by the numeral 100 in the drawings. The gear train mechanism 100 includes spur gear 48 attached to motor 40, an intermediate gear member 102 (FIG. 4), and a sector gear member 104 (FIG. 7). The intermediate gear 102 is mounted on a shaft member 106 which is secured to the housing or body member 22 (see FIGS. 1–3). The intermediate gear 102 can freely rotate on shaft 106.

The intermediate gear 102 has a first series of gear teeth 108 on a first section 109 and a second series of gear teeth 110 on a second section 111. A boss 130 which is used to actuate the default lever (as explained below) is positioned on the first section 109. The gear teeth 108 on gear 102 are positioned to mesh with the gear teeth 47 on the motor driven gear 48, while the gear teeth 110 are positioned and adapted for mating with the gear teeth 112 on the sector gear 104. As shown in the drawings, the teeth 112 on gear 104 are only provided on a portion or sector of the outside circumference of the gear member.

All of the gear members 48, 102 and 104 are preferably made of a plastic material, such as nylon, although they can be made of any other comparable material, or metal, which has equivalent durability and function.

The sector gear 104 is preferably molded onto the end 63 of the throttle body shaft 62. For this purpose, the recesses 76 are provided in the shaft 62 which allow the sector gear to be integrally molded to the shaft and be permanently affixed thereto. The lower end 105 of the sector gear is preferably formed such that it contacts bearing 86, thus helping to hold throttle body shaft in axial position.

The sector gear 104 has a central portion or member 114 which extends above the gear train 100 and either communicates with or makes direct contact with the throttle position sensor (TPS) mechanism 32 in the cover member 24. In order for the TPS to read the position of the throttle valve plate 60, the TPS must be able to correctly sense or read the movement and rotation of the throttle body shaft 62. For this purpose, the central member 114 on the sector gear 104 can be positioned in a mating hub (not shown) inside the cover member 24, which then by rotation or movement would be able to detect the movement and resultant position of the throttle valve plate 60. In an alternate embodiment, a small (rectangular) magnet 113 could be positioned on the upper end of the central member 114. The TPS could then be set up to read the direction of the magnetic field emanating from the magnet and thus read or sense the rotational movement of the throttle body shaft and valve plate in order to feedback the position to the EPU.

In order to operate the throttle valve plate 62, a signal from the EPU is sent to the motor 40 through the electronics module in the cover 24. The motor rotates spur gear 48 which then rotates intermediate gear 102. The rotation of gear 102 in turn rotates sector gear 104 and also throttle body shaft 62, which is directly attached to gear 104. The rotation of shaft 62 accurately positions the valve plate 62 in the passageway 72 and allows the requisite and necessary air flow into the engine in response to movement of the accelerator.

Figure 8:
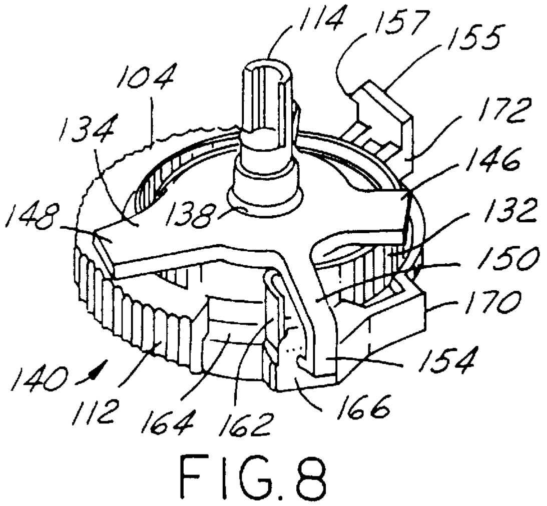
FIG. 8 illustrates a sub-assembly of a sector gear, spring member and default lever in accordance with one embodiment of the present invention.
Figure 7A:
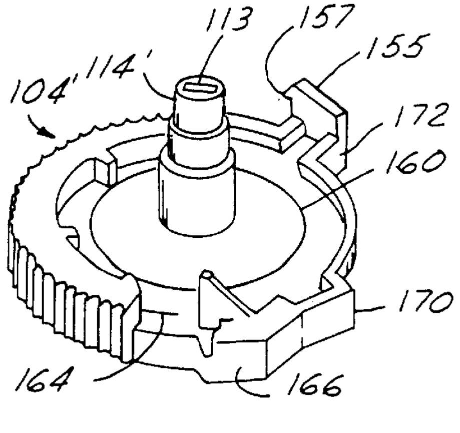
FIG. 7A illustrates another sector gear member which can be utilized with the present invention.

The present invention also has a fail-safe mechanism which allows the throttle valve plate to remain open in the event of a failure of the electronics system in the throttle control mechanism or in the entire vehicle. For the "fail-safe" mechanism of the present electronic throttle control assembly 20, a spring member 132 and a default lever member 134 are utilized in combination with the sector gear member 104. For ease of assembly, the combination of sector gear member 104, spring member 132, and default lever member 134 are joined together to form a sub-assembly 140, as shown in FIG. 8. This sub-assembly, in combination with ridge wall or stop member 143 in the gear train section 30 of the housing 22 act together to limit the operation of the valve plate member and control the operation of the fail-safe mechanism.

Figure 5:
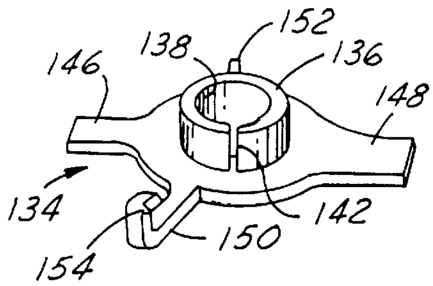
FIG. 5 illustrates a default lever which can be utilized in the present invention.
Figure 6:
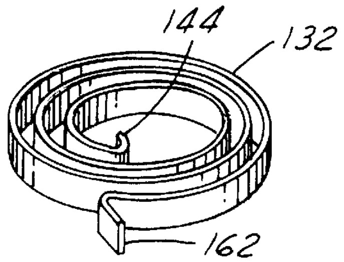
FIG. 6 illustrates one embodiment of a spring member which can be utilized with the present invention.

The default lever member 134, as best shown in FIGS. 2, 5 and 7, has a circular central collar member 136 on one side with a central opening 138 therein. The collar member 136 also has an opening or slot 142 which is adapted to mate with one end, particularly the inner end 144, of the spring member 132. The default lever member 134 also has a stop arm member 146, a driver arm member 148 and a pair of spring control arms 150 and 152. The control arms 150 and 152 rest on top of the spring member and act to hold it in place in the gear 104. The spring control arm 150 also has a snap fit finger member 154 on the end thereof which is utilized to help hold the sub-assembly 140 together, as described below.

The central opening 138 of the default lever member 134 is positioned over the central member 114 of the sector gear 104. This allows the default lever 134 to rotate freely relative to the sector gear member.

When the sub-assembly 140 is assembled, the spring member 132 is joined together with the default lever member 134. In this regard, the spring member 132 is positioned on the bottom of the default lever member 134, around the collar member 136 with the inner end 144 of the spring member 132 positioned in slot 142.

The spring member 132 is then compressed sufficiently to allow the spring member to fit within the recessed area or cavity 160 on one side of the sector gear member 104 (see FIG. 7). When the spring member 132 is positioned on the sector gear member 104, the outer end 162 of the spring member is positioned in the opening or slot 164 in the sector gear member between the sector of gear teeth 112 and the shoulder or tab member 166.

The bias of the spring member 132, together with the snap fit finger member 154 hold the sub-assembly 140 together. In this manner, the assembly of the three components of the gear train and fail-safe mechanisms into the electronic throttle control assembly is faster and easier. Rather than attempting to first assemble the sector gear member in the gear section of the housing, and then mount the spring member 132 and default lever member 134 on the sector gear member, while at the same time biasing the spring member, instead the members 132, 134 and 104 are first assembled together to form sub-assembly 140 which is then positioned as a unit or sub-assembly in the gear train cavity 30.

Figure 12:
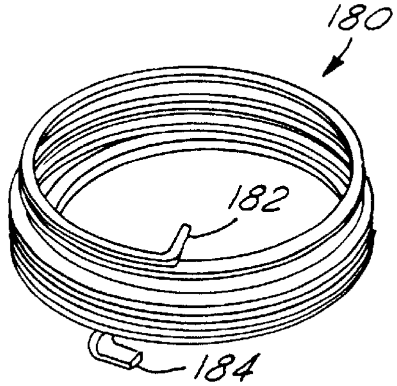
FIG. 12 illustrates an axial spring clip member which can be utilized with the present invention.

An alternate spring member 180 is shown in FIG. 12. The spring member 180 is a helical torsion spring member and has a pair of ends 182 and 184. The torsion spring member 180 and be used in place of the helical "clock-type " spring member 132 described above. The ends 182 and 184 of the spring member 180 correspond generally to the inner and outer ends 144 and 162, respectively, of spring member 132 and generally provide a similar function and purpose. In this regard, however, end 182 of spring member 180 is positioned on top of the default lever member 134, rather than being positioned inside the collar member. The other end 184 of the spring member 180 is positioned in the same slot or opening 164 in the sector gear member 104 as the end 162 of the spring member 132.

The sector gear member 104 also has a stop shoulder or first positioner member 170 and a ramp stop or second positioner member 172. The two stops or positioner members are utilized in combination with the stop arm member 146 and driver member 148 on the default lever member 134, and with the spring member 132 and wall ridge 143, to provide a fail-safe mechanism for use with the electronic throttle control assembly in accordance with the present invention.

In operation of the fail-safe mechanism, the spring member 132 is positioned so that it is biased in both directions of rotation, and has a neutral or unbiased position when the throttle plate is at a slightly opened position (i.e., the "default position").

Figure 9:
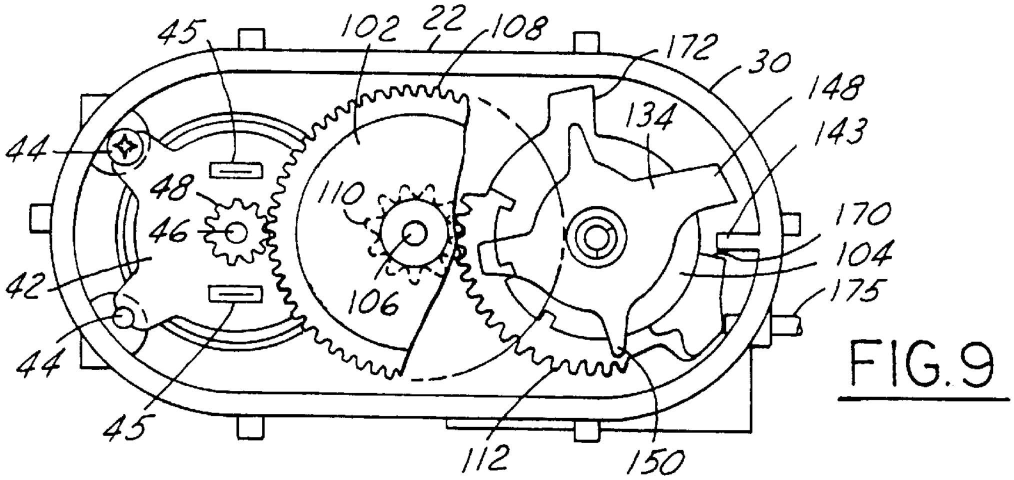
FIGS. 9, 10 and 11 illustrate the range of operation of a gear train in accordance with one embodiment of the present invention.
Figure 9A:
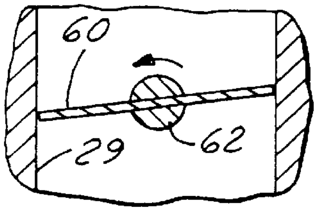
FIGS. 9A, 10A and 11A illustrate the positioning of the throttle valve plate during the range of operation of the present invention.
Figure 10:
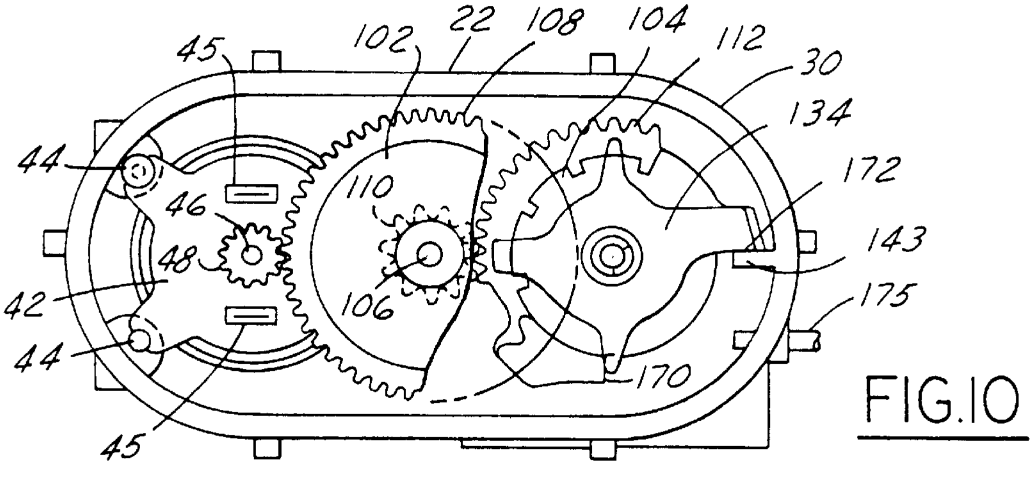
Figure 10A:
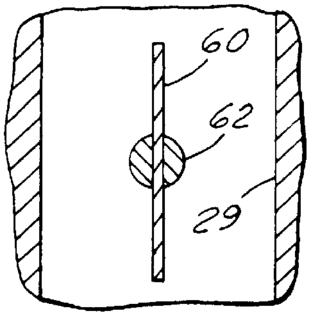

As shown in FIGS. 9A and 10A, the throttle plate 60 has a range of operation between a fully closed position (FIG. 9A) to a fully opened position (FIG. 10A). In FIG. 9A, the air passageway 72 is completely blocked off. In FIG. 10A, the throttle plate is positioned parallel with the airflow thus allowing a full compliment of air to pass through the passageway 72. In this regard, when the throttle plate 60 is in its fully closed position, it actually is positioned about 70°–100° from a position transverse to the air flow passageway axis. This allows better movement and ease of opening of the throttle valve member. Then, when the throttle valve plate member is in the default position, it is opened about 5°–10° from the throttle valve's closed position, or about 12°–20° from a position transverse to the axis of the air flow passageway.

The two stops or positioner members 170 and 172 on the sector gear 104 are used in combination with the wall ridge 143 on the housing 22, to limit the range of motion of the throttle valve and ensure that it does not go past the fully open or fully closed positions. For example, when the throttle valve plate is in its fully open position (FIG. 10A), the second positioner member 172 is abutted against the wall stop 143 and prevented from opening any further (see FIG. 10). When the throttle valve plate is in its fully closed position (FIG. 9A), the first positioner member 170 is abutted against the opposite side of wall stop 143 thus preventing the valve plate from attempting to close more tightly and perhaps wedging shut or adversely affecting further operation (see FIG. 9).

Figure 11:
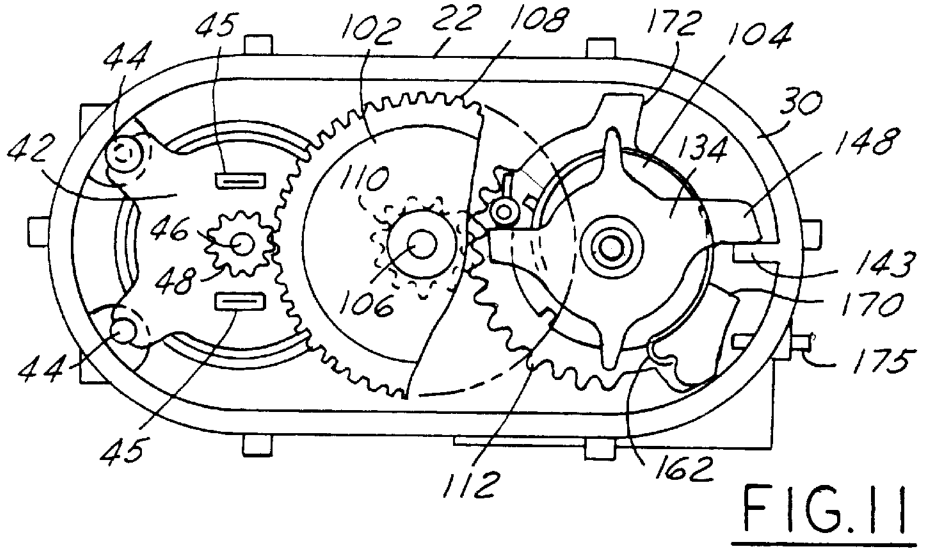
Figure 11A:
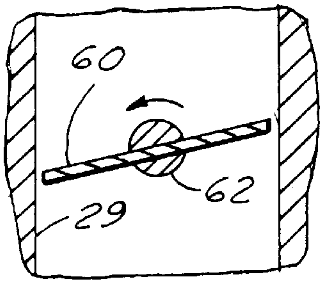

In the fail-safe position of operation, the throttle plate 60 is at a slightly opened position, as shown in FIG. 11A. In such a position, the throttle valve allows some air to flow through the passageway 72, thus allowing the engine sufficient inlet air in order to operate the engine and for the vehicle to "limp-home".

Figure 9B:
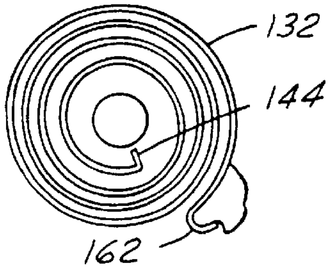
FIGS. 9B, 10B and 11B illustrate the movement of use of the spring member during the range of operation of the present invention.
Figure 10B:
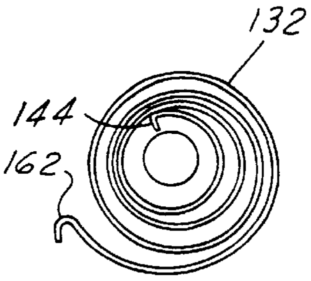

When the sub-assembly 140 is positioned in the gear section 30, the spring member 132 is positioned such that its inner end 144 is biased when the throttle plate is in its closed position, as shown in FIGS. 9A and 9B, while its outer end 162 is biased when the throttle plate is in its fully open position, as shown in FIGS. 10A and 10B. Thus, at all times except when the throttle valve is in the default open position, the spring member 132 is biased in one direction or the other during operation of the throttle control valve system. The force of the motor 40 acting through the gear train mechanism 100 overcomes the biasing forces provided by the spring member 132 and operates the control of the throttle valve plate 60.

Figure 11B:
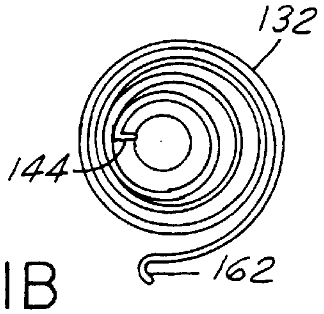
Figure 13:
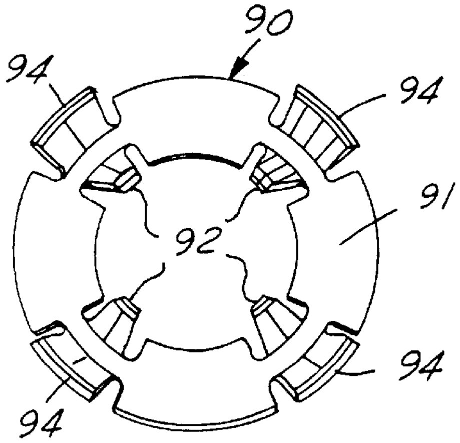
FIG. 13 illustrates another embodiment of a spring member which can be used with the present invention.

The movement of the sector gear 104, default lever 134 and spring member 132 when the throttle valve 60 moves between the open, closed and default positions, are shown in FIGS. 9 and 9B (closed position), FIGS. 10 and 10B (open position) and FIGS. 11 and 11B (default position). The wall ridge 143 acts as a stop to limit movement of the default lever 134 (through stop arm member 148) and the sector gear member 104 (through first and second positioner members 170 and 172).

If the electronic system of the vehicle were to experience problems or fail, or if the electronics 32 or motor 40 were to fail, then the bias in the spring member 132 would return the default lever member 134 to the position shown in FIG. 11, where the stop arm 148 would be positioned against the housing wall ridge member or stop 143. This would keep the throttle plate 60 at its partially opened position as shown in FIG. 11A.

While the invention has been described in connection with one or more embodiments, it is to be understood that the specific mechanisms and techniques which have been described are merely illustrative of the principles of the invention. Numerous modifications may be made to the methods and apparatus described without departing from the spirit and scope of the invention as defined by the appended claims.

What is claimed is:

1. An electronic throttle control system comprising:

a housing containing a motor section, a throttle section and a gear section;

a motor positioned in said motor section;

an air passageway in said throttle section;

a throttle body shaft and throttle valve plate positioned in said throttle section, said throttle body shaft rotatably positioned in said housing and extending through said air passageway, and said throttle valve plate attached to said throttle body shaft and positioned in said air passageway;

a pair of bearing members positioned in said housing and supporting said throttle body shaft during rotation, said bearing members each comprising a pair of race members;

a gear train mechanism positioned in said gear section and operably connecting said motor to said throttle body shaft;

a cover member positioned on said housing and covering at least part of said motor and gear train mechanism;

electronic means in said cover for operating said motor and said throttle body shaft through said gear train; and a clip member attached to said throttle body shaft;

said clip member preloading at least one of said bearing members in order to prevent axial movement of said associated race members and prevent axial movement of said throttle shaft.

2. The electronic throttle control system of claim 1 wherein said clip member has a plurality of tab members thereon for attaching said clip member securely to said throttle body shaft and to said housing.

3. A throttle valve assembly comprising:

a housing;

an air passageway in said housing;

a throttle body shaft rotatably positioned in said housing and extending through said air passageway;

at least one bearing member in said housing and supporting said throttle body shaft during rotation, said bearing member being a pair of race members;

a throttle valve plate connected to said throttle body shaft and positioned in said air passageway;

at least one gear member rotatably positioned in said housing and attached to said throttle body shaft;

a motor for rotating said at least one gear member; and a clip member positioned on said throttle body shaft;

said clip member pre-loading said bearing member in order to prevent axial movement of said race members and axial movement of said throttle body shaft.

4. The throttle valve assembly of claim 3 wherein said clip member has a plurality of tab members thereon for attaching said clip member securely to said throttle body shaft and to said housing.

5. The throttle valve assembly of claim 3 wherein two bearing members are provided, one on either side of said air passageway.

6. The throttle valve assembly of claim 3 wherein said at least one gear member is molded directly onto said throttle body shaft.

7. The throttle valve assembly of claim 3 wherein two gear members are provided, one attached to said throttle body shaft and the other attached to said motor.

8. The throttle valve assembly of claim 3 further comprising a gear train positioned in said housing between said motor and said throttle body shaft and including said at least one gear member.

* * * * *